A. B. UNDERHILL.
Chuck.
No. 45,364. Patented Dec. 6, 1864.
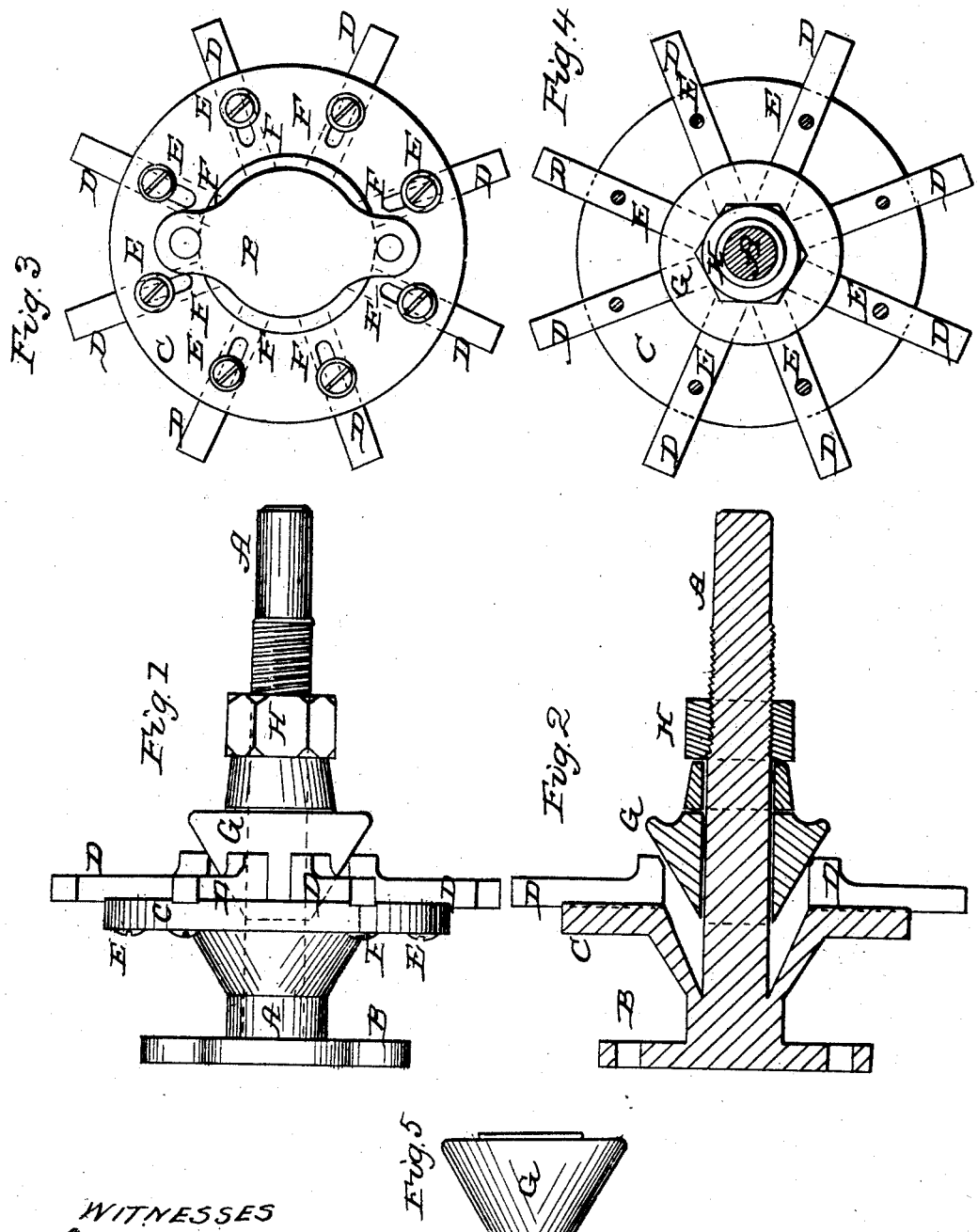
WITNESSES
INVENTOR
A. B. Underhill

UNITED STATES PATENT OFFICE.

A. B. UNDERHILL, OF MEADVILLE, PENNSYLVANIA.

IMPROVED CHUCK.

Specification forming part of Letters Patent No. 45,364, dated December 6, 1864.

*To all whom it may concern:*

Be it known that I, A. B. UNDERHILL, of Meadville, Crawford county, State of Pennsylvania, have invented certain new and useful Improvements in Chucks for Turning Metal and other Purposes; and I do hereby declare the following to be a full description of the same.

The nature of my invention consists in the use of a conical wedge adjusted on the mandrel of the chuck, in combination with a screw-nut working on the mandrel against the base of the cone, so that as the screw-nut is set backward or forward it raises or lowers the jaws of the chuck, and thereby obtains a simple and at the same time perfect adjustment of them upon the article to be turned down in the lathe.

But to describe my invention more particularly, I will refer to the accompanying drawings, forming a part of this specification, the same letters of reference, wherever they occur, referring to like parts.

Figure 1 is a longitudinal side view of the chuck. Fig. 2 is a longitudinal cut section of the same. Fig. 3 is a back end view of same. Fig. 4 is a front end view of the same. Fig. 5 is a detached view of the conical wedge.

Letter A is the mandrel, having secured on its back end a plate of metal, B, for the purpose of attaching the chuck to the lathe. Also secured to the mandrel is a circular plate, C, to the face of which are secured eight (or more or less, as may be desired) radial jaws, D. These jaws work in channels or guideways cut in the face of the plate C, and are kept in place by means of binding-screws E, working through slots F in the plate C and engaging into the sides of the jaws, so as to hold them firmly to their places when clamping the article to be turned down in the lathe.

Letter G is a conical wedge, which is made to slide on the mandrel, and having its apex projecting into the hollow or core of the circular plate C, so as to cause the lower ends of the jaws always to rest upon the periphery of the cone. By adjustment of it, therefore, by means of the screw-nut H on the mandrel, it will be obvious that the jaws will be set to any required diameter by the simple operation of turning up the screw-nut.

To facilitate the operations of the cone and to admit of its being used with a very gradual inclination, a cavity is formed in the center of the circle-plate C around the mandrel, so that the apex of the cone may penetrate the cavity, and thus give space for the use of a long cone. The importance of this will be obvious as the motion of the jaws will be much more gradual, and at the same time require much less power to bring them to an adjustment.

Having now described my invention, I will proceed to set forth what I claim and desire to secure by Letters Patent of the United States—I claim:

1. The formation of the cavity in the hub to which the circle-plate C is attached and around the mandrel, for the purpose of using a longer cone than could otherwise be used to move the jaws of a chuck if there were no such cavity formed in the plate.

2. In combination with the said circle-plate C, made as described, the use of the conical wedge G and mandrel A, for the purpose of operating the jaws of a chuck, substantially as described.

A. B. UNDERHILL.

Witnesses:
T. M. FORGUSON,
C. M. BOUSH.